United States Patent [19]

Job

[11] 4,444,369

[45] Apr. 24, 1984

[54] MOUNTING RING

[75] Inventor: E. Gale Job, Greeneville, Tenn.

[73] Assignee: Essex Group, Inc., Fort Wayne, Ind.

[21] Appl. No.: 415,772

[22] Filed: Sep. 7, 1982

[51] Int. Cl.³ .............................................. G12B 9/00
[52] U.S. Cl. ..................................... 248/27.1; 52/39;
       248/56; 403/197
[58] Field of Search .................... 248/27.1, 56, 27.3;
       285/42, 192, 205, 401, 402, DIG. 6; 403/238,
       239, 197; 52/39, 465, 489, 484; 174/153 G;
       126/317, 314

[56] References Cited

U.S. PATENT DOCUMENTS

| | | | |
|---|---|---|---|
| 1,665,484 | 4/1928 | Thompson | 248/DIG. 6 |
| 2,100,042 | 11/1937 | Travis | 248/27.1 |
| 2,140,443 | 12/1938 | Clark | 248/27.3 |
| 2,234,441 | 3/1941 | Ludwig | 174/194 |
| 2,684,400 | 7/1954 | Redmond | 174/153 G |
| 3,052,065 | 9/1962 | Rettman | 126/317 |
| 3,193,613 | 7/1965 | Van Buren | 248/27.3 |
| 4,299,363 | 11/1981 | Datschefski | 248/56 |
| 4,306,743 | 12/1981 | Hinshaw et al. | 248/396 |

*Primary Examiner*—William H. Schultz
*Assistant Examiner*—Ramon O. Ramirez
*Attorney, Agent, or Firm*—Stephen A. Schneeberger

[57] ABSTRACT

A mounting ring is suited for installation in an opening in a wall or ceiling to provide support thereat for a device, such as a sensor. The ring includes an annular frame with a pair of deformable retaining tabs extending therefrom for manual deformation into retaining engagement with the inner surface of the wall or ceiling. Centering tabs may aid in centering the ring about the opening. One or more antirotation tabs may extend from the frame into the wall or ceiling to prevent rotation of the mounting ring. One or more support tabs on the frame are sized and positioned to longitudinally support a tubular device extending within the opening in the ceiling or wall. The device may be provided with a complementary supporting surface or shoulder. Conveniently, the device is rotated about its longitudinal axis to bring its supporting surface into supported alignment with that of the mounting ring. Such rotation may also serve, via the mounting ring support tab, to urge the device into engagement with the wall or ceiling. Detents may be provided on the mounting ring to interact with the device and inhibit rotation of the device out of supported engagement with the mounting ring.

13 Claims, 4 Drawing Figures

MOUNTING RING

DESCRIPTION

1. Technical Field

The invention relates to a mounting structure and more specifically to a mounting ring for supporting a device in an opening in a ceiling or wall.

2. Background Art

A variety of mounting arrangements have existed for installing various devices in the walls and ceilings of buildings. Such mounting arrangements have typically used some form of nail or threaded fastener to affix the mounting device to a structural member of the room. Often such mounting arrangements are most conveniently installed during the construction of the room, and are retrofitted into an existing ceiling or wall only with difficulty. Moreover, the increased use of relatively lightweight ceiling tiles in the dropped-ceilings of modern construction have tended to further limit the mounting arrangements and fasteners which may be used directly with such lightweight materials as the supporting medium.

An example of one type of device requiring support in the ceiling or wall of a room is that of a sensor. Such sensors may be utilized to detect the presence of light, heat, movement or some other sensible property within the room. The exact positioning of such a sensor in the room may be important, typically being in the ceiling, and may require reliance on the ceiling tiles for the basic structural support unless significant time and expense is to otherwise be incurred.

Therefore, it is a principal object of the present invention to provide a mounting ring which is easily installed, particularly in an opening in an existing ceiling or wall.

It is another object of the present invention to provide a mounting ring which affords blind installation without the use of special installation tools.

It is yet another object of the present invention to provide a mounting ring which can securely support and retain a particular device, such as a sensor or the like, therewithin.

It is a still further object to provide a mounting ring which is of relatively low cost to manufacture.

It is an even further object to provide a mounting ring which is especially suited for installation in a ceiling.

It is yet a further object of the invention to provide a mounting arrangement including a mounting device having the aforementioned characteristics and a device structured for cooperative support thereby.

In accordance with the invention, there is provided a mounting ring adapted for installation in an opening in a ceiling or wall to support a device in that opening. The mounting ring comprises an annular frame portion and at least two retaining tabs extending from that frame portion. The retaining tabs are manually deformable into retaining engagement with the ceiling or wall to thereby maintain the frame portion positioned adjacent to the ceiling or wall in substantially parallel relationship therewith. The retaining tabs extend from the inner perimeter of the frame portion and, where two such tabs exist, are spaced approximately 180° and have a length which is between 50% and 100% of the inside diameter of the frame. Each retaining tab includes a relatively narrow, central spine having a plurality of cross-ribs arrayed therealong and is joined to the frame portion by a pair of angularly spaced, relatively narrow legs at its base.

One or more teeth may extend from the mounting rings frame portion so as to engage and extend into the outersurface of the ceiling or wall to prevent rotation of the mounting ring. Centering tabs may extend from the frame portion to aid in centering the mounting ring within the opening. Support tabs extend radially inward from the inner perimeter of the frame portion for longitudinally engaging and supporting shoulders provided on the device to be supported. The mounting ring is of integral construction and is formed by stamping from a manually deformable metal, such as thin terne-plated steel.

The device to be supported by the mounting ring typically is tubular and may be installed in the mounting ring by insertion longitudinally inward therethrough and partial rotation thereof so as to bring shoulders facing longitudinally outward into supported engagement with the support tabs on the mounting ring. Those support tabs may be inclined such that the device is urged longitudinally inward so as to urge a skirt thereon into contact with the ceiling or wall as it is rotated into position. Detenting means on the support tabs and/or the tubular device aid in maintaining such positioning. The mounting arrangement is especially suited to ceiling installations, wherein the longitudinally inward direction is upward.

BEST MODE FOR CARRYING OUT THE INVENTION

Figure 1:
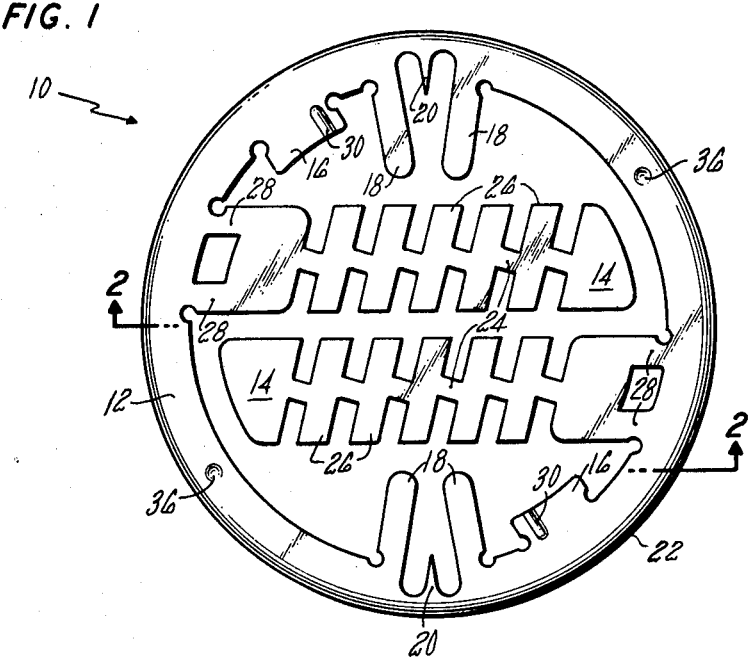
FIG. 1 is a plan view of the mounting ring following stamping.

Referring to FIG. 1 there is illustrated a mounting ring 10 following stamping and before bending, in accordance with the invention. The mounting ring 10 is principally comprised of an annular or circular frame portion 12 and various tabs extending therefrom. More specifically, mounting ring 10 includes two or more retaining tabs 14, and preferably also includes support tabs 16, centering tabs 18 and antirotation teeth 20. The mounting ring 10 is preferably formed as an integral member, as by stamping, from a blank of a material which is strong, permits manual deformation without fatiguing and, if metal, is rustproof. A 0.9 millimeter steel blank having a terne plate of 15% tin and 85% lead provides suitable results.

The mounting ring 10 will be described hereinafter with reference to installation in a ceiling, however, it will be understood that such installation might alternately be made in a vertical wall.

The outer periphery of annular frame 12 is rolled downward to form skirt 22 and thereby increase the rigidity of the frame portion. In the illustrated embodiment, the outside diameter of the mounting ring 10 is about 65 millimeters and the principal inside diameter is about 52 millimeters. The two retaining tabs 14 each extend from the inner perimeter of the frame portion 12 at locations spaced approximately 180° from each other. Retaining tabs 14 each extend longitudinally at least 50%, and typically nearly 100% of the inside diameter of the frame portion 12. In the illustrated embodiment, retaining tabs 14 each have a length of 47 millimeters. Each retaining tab 14 is formed by a longitudinally extending central spine 24 having a series of cross-ribs 26 arrayed along its length. Each retaining tab 14 is joined to the frame portion 12 by means of a pair of legs 28 extending from the spine 24. The spine 24 is typically narrow, as for instance 2 millimeters, to facilitate manual deformation of the tabs 14 in a direction normal to the plane of the material. The cross-ribs 26 provide increased surface area and a shape for engaging and, to some extent, gripping a ceiling in a manner to hereinafter become evident. The pair of legs 28 associated with each retaining tab 14 enable those tabs to be bent to a preliminary position, illustrated in FIG. 2, without sacrificing the structural integrity of the tabs.

Figure 2:
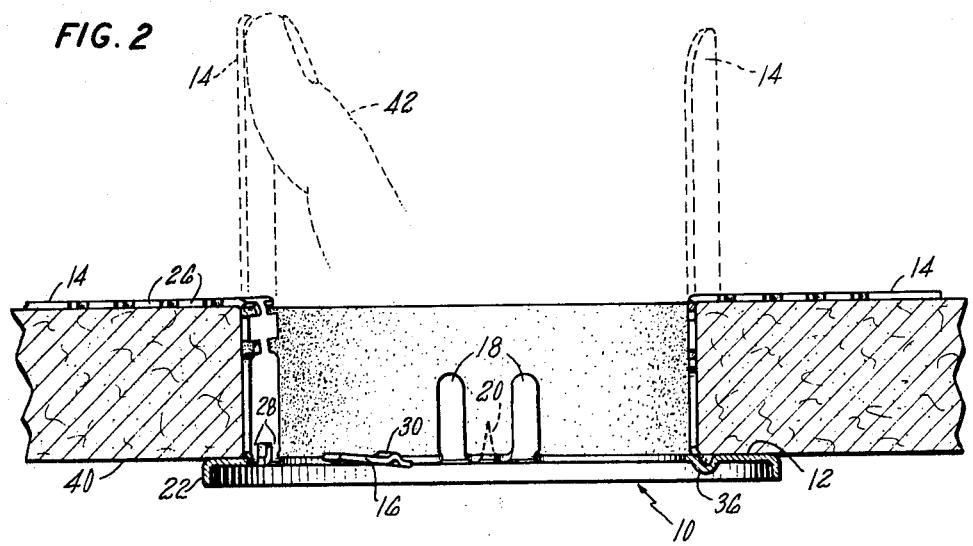
FIG. 2 is a side elevation view, in section, showing the mounting ring installed in an opening in a ceiling.

Referring further to FIGS. 1 and 2, two antirotation teeth 20 are disposed at opposite sides of the frame 12 and angularly disposed about 90° from the respective retaining tabs 14. Two pairs of centering tabs 18 extend radially inward from the inner perimeter of the frame 12, each pair being adjacent to a respective antirotation tooth 20. More specifically, the centering tabs 18 of each pair are angularly spaced form one another by about 20° and the respective antirotation tooth is positioned midway between. The centering tabs 18 may extend radially inward approximately 10 millimeters from the inner periphery of frame 12 and the antirotation tooth 20 is formed by a pair of cusps or recesses into the inner diameter of the frame. Thus, each antirotation tooth 20 extends radially inward approximately 4 millimeters from its base, which base is intermediate the inner and outer diameters of the frame portion 12.

A pair of support tabs 16 are positioned diametrically opposite one another and extend radially inward 3 or 4 millimeters from the inner perimeter of the frame portion. The support tabs 16 may be relatively wider than the centering tabs 18, each having a width, or angular extent, of about 10 millimeters. Each support tab 16 includes a vertically-upset male detenting member 30.

Referring to FIG. 2, the retaining tabs 14, the centering tabs 18 and the antirotation teeth 20 each are preliminarily bent, as by a bending machine, such that they extend upward at approximately 90° from the frame portion 12 prior to installation in a ceiling. Additionally, each support tab 16 is rotated about 5°-10° about a centerline extending radially of the mounting ring such that it is inclined in the angular or circumferential direction for a purpose which will become hereinafter evident. Minimum-radius corners may be provided at each bend point to avoid stress fractures when bending the tabs.

Referring to FIG. 2, the mounting ring 10 is illustrated in its installed position in and adjacent to ceiling 40. More specifically, ceiling 40 may be an acoustical tile of some composite material through which a 52 millimeter diameter opening has been drilled or cut. The retaining tabs 14, shown in dotted line, are extended upwardly through the opening in ceiling 40 until the frame portion 12 is parallel with and abuts the undersurface of the ceiling. The installer's finger 42 may then be inserted through the ceiling opening and used to manually deform or bend each retaining tab over in a radially outward direction until it engages the upper surface of the ceiling 40, and thereby vertically supports the mounting ring in position. The cross-ribs 26 on the retaining tabs 14 increase the surface area in engagement with the upper surface of ceiling 40. In this installed position, the centering tabs 18 of mounting ring 10 are radially positioned such that they extend just inside the opening in ceiling 40 and may act to center the mounting ring within that opening. On the other hand, it will be noted from the dotted line illustration of antirotation tooth 20 that such tooth, being radially outward of the centering tabs 18, necessarily extends upward into the material of ceiling 40 to prevent rotation of the mounting ring 10.

Figure 3:
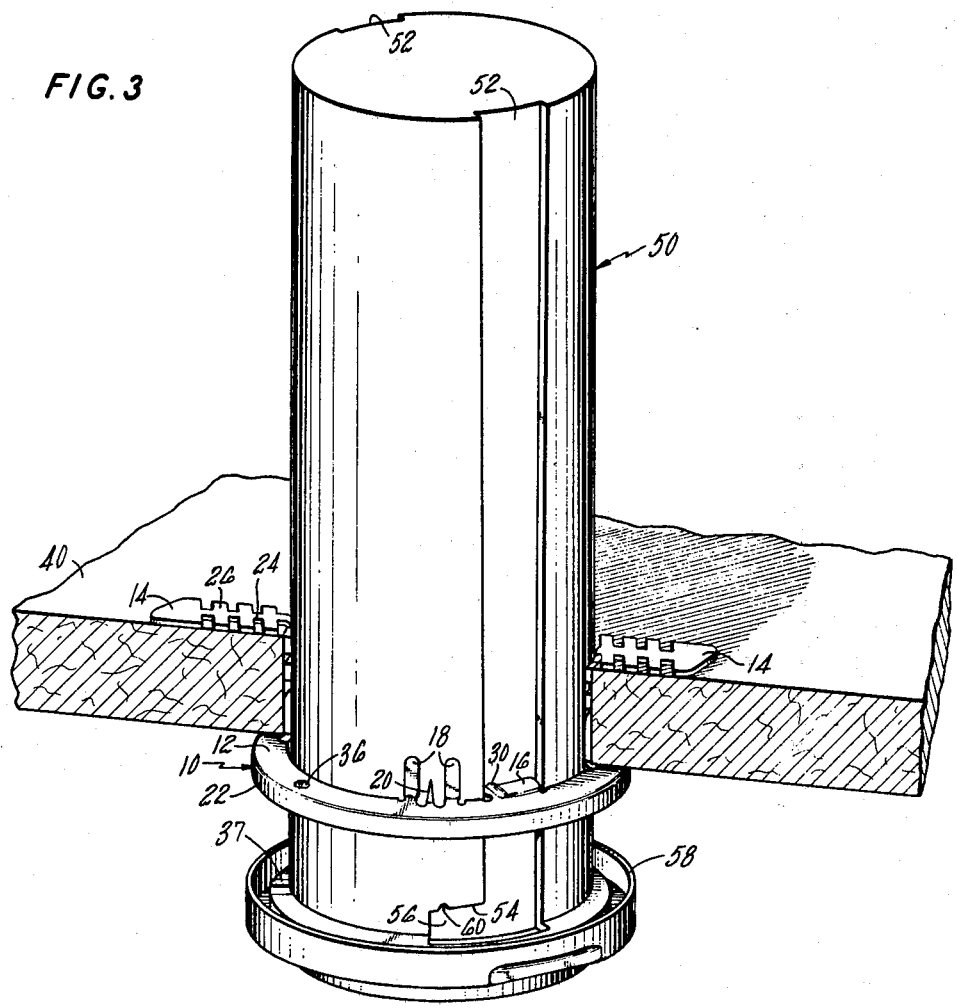
FIG. 3 is a perspective view, partly in section, of the mounting ring installed in a ceiling and showing a tubular device during installation.

Referring to FIG. 3, a tubular device 50 is illustrated during installation in the mounting ring 10. Device 50 may, for instance, be the housing associated with an infrared sensor and its associated electronics for detecting the presence of a human at some location within a room. Such sensors are utilized to automatically control certain functions, such as room lighting. Tubular device 50 includes a slot 52 extending longitudinally of the device from its upper end to near its lower end. The outside diameter of the tubular device 50 is only slightly less than that of the inside diameter of mounting ring 10, i.e., about 51 millimeters, and the slot 52 is of sufficient width and depth to allow the relative passage of the supporting tab 16 therethrough during upward insertion of the device 50. Slot 52 is relatively wide at the top to facilitate entry of supporting tab 16, and gradually decreases in the downward direction. A downwardly facing shoulder 54 is angularly or circumferentially displaced from the slot 52 and is formed on the outer surface of device 50 by an arcuate recess 56 in the outer circumference of the device. The device 50 is inserted upwardly until the recess 56 is adjacent the respective mounting ring supporting tab 16 whereupon, referring to FIG. 4, the device may be rotated to bring its shoulder 54 into vertical registry with and support by the mounting tab 16. It will be understood that device 50 includes a similar slot 52 and support shoulder 54 on the opposite side of its diameter, not shown, for interaction with the other support tab 16 on the mounting ring. Moreover, it will be understood that sufficient space is presumed to exist above ceiling 14 or beyond a wall to accept the length of device 50.

Figure 4:
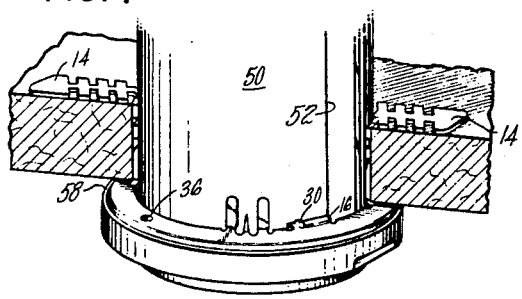
FIG. 4 is a perspective view generally similar to FIG. 3 and showing the tubular device in its installed position.

It will be recalled that the supporting tabs 16 are skewed or inclined slightly, when viewed in the angular or circumferential direction. Similarly, the shoulders 54 on the device 50 are correspondingly inclined in that same direction. That inclination of the supporting tabs 16 and shoulders 54 is such that as the device 50 is rotated to bring the shoulders into alignment with the supporting tabs 16, the device is displaced upwardly. More specifically, an annular stop 58 is provided by an upwardly facing shoulder on a flange or skirt near the lower end of the device 50, and the axial positioning of that stop 58 and the shoulder 54 relative to the support tab 16 is such that the stop 58 is drawn into firm engagement with the undersurface of ceiling 40 when the device is rotated to the angular limit of recess 56. Additionally, each downwardly facing support shoulder 54 in the device 50 will include an upwardly extending detent recess 60 for detenting engagement with the detent 30 on support tab 16 when the device 50 is rotated to its limit. In this manner, the mounting ring 10 is capable of positioning and maintaining the device 50 in fixed, mounted relationship relative to ceiling 40, as illustrated in FIG. 4. A pair of detent dimples 36 in the mounting ring 10, FIGS. 2 and 3, may be provided to coact with pairs of ridges 37 on device 50, FIG. 3, to provide additional detenting if such is desirable.

It will be appreciated that the aforedescribed mounting arrangement is relatively inexpensive, may be simply and manually installed in a ceiling and allows easy installation and removal of the device 50. It will also be appreciated that the mounting ring 10 might be provided with a greater or lesser number of support tabs 16, centering tabs 18 and antirotation teeth 20; however, at least two retaining tabs 14 would normally be required.

Although this invention has been shown and described with respect to detailed embodiments thereof, it will be understood by those skilled in the art that various changes in form and detail thereof may be made without departing from the spirit and scope of the claimed invention.

I claim:

1. A mounting ring adapted for installation in an opening in a ceiling or wall to support a device within the opening, comprising:
    an annular frame portion;
    at least two retaining tabs extending from the frame portion, each said retaining tab including a relatively narrow central spine having a plurality of cross-ribs arrayed therealong, said retaining tabs being extendible inward through said opening and being manually deformable into retaining engagement with the ceiling or wall to thereby maintain said frame portion positioned adjacent to the ceiling or wall in substantially parallel relation therewith; and
    said frame portion including means for engaging and supporting the device in a predetermined position relative thereto.

2. The mounting ring of claim 1 wherein said retaining tabs each extend from the inner perimeter of the frame portion.

3. The mounting ring of claim 2 wherein said retaining tabs comprise a pair of tabs extending from approximately 180° spaced locations on the inner perimeter of said frame portion the length of each said retaining tab being between 50% and 100% of the inside diameter of the frame portion.

4. The mounting ring of claim 1 wherein each said retaining tab includes a pair of angularly spaced, relatively narrow legs at its base through which it is joined to said frame portion.

5. The mounting ring of claim 4 wherein said frame portion and retaining tabs are integral and are formed by a metal stamping.

6. The mounting ring of claim 1 further including antirotation means extending from said frame portion for rotation-preventing engagement with the ceiling or wall.

7. The mounting ring of claim 6 wherein said antirotation means comprises at least one pointed tooth extending from the frame portion and being positioned and oriented for insertion into the outer surface of the ceiling or wall.

8. A mounting ring adapted for installation in an opening in a ceiling or wall to support a device within the opening, comprising:
    an annular frame portion;
    at least two retaining tabs extending from the frame portion, said retaining tabs being extendible inward through said opening and being manually deformable into retaining engagement with the ceiling or wall to thereby maintain said frame portion positioned adjacent to the ceiling or wall in substantially parallel relation therewith;
    a plurality of centering tabs extending from the frame portion at angularly spaced locations thereabout, said centering tabs being also angularly spaced from said retaining tabs and being positioned for radially engaging the wall of the opening in the ceiling or wall to thereby aid in centering said mounting ring relative to said opening; and
    said frame portion including means for engaging and supporting the device in a predetermined position relative thereto.

9. The mounting ring of claim 8 wherein said support tab means comprises a plurality of support tabs equiangularly spaced around the frame portion.

10. The mounting ring of claim 9 wherein said support tabs include longitudinally extending detenting means for detented engagement with complimentary longitudinally extending detenting means in said device shoulder means thereby to inhibit rotation of the device relative to said mounting ring.

11. The mounting ring of claim 10 wherein the device includes longitudinally-extending slots in the outer surface thereof to clear said support tabs during installation of said device into said mounting ring and stop means facing longitudinally inward and positioned to engage the ceiling or wall and limit further inward displacement of the device, said device shoulder means being angularly displaced from said slots, and wherein at least said support tabs are inclined in the direction of said angular displacement of the device shoulder means from the slots such that rotation of said device to place said device shoulders in longitudinal alignment with said support tabs displaces said device and said stop means thereof inward into engagement with the ceiling or wall and said detenting means into said detented engagement.

12. A mounting arrangement for supporting a tubular device in a generally circular opening extending through a ceiling or wall, comprising:
    a mounting ring, said ring including an annular frame portion, at least two retaining tabs extending from said frame portion, antirotation means extending from said frame portion and support tab means extending radially inward from said frame portion, said retaining tabs being insertable through said ceiling or wall opening and being manually deformable radially outward into retaining engagement with an inner surface of the ceiling or wall to thereby maintain said frame portion in an installed position adjacent to an outer surface of the ceiling or wall in substantially parallel relation therewith, said antirotation means being in rotation-preventing engagement with said ceiling or wall in said installed position of said annular frame; and
    a substantially tubular device configured to be inserted longitudinally inward through said mounting ring frame portion in a particular angular orientation and including support shoulder means facing longitudinally outward and stop means facing longitudinally inward, said device being rotatable to place said shoulder means in longitudinal alignment with said mounting ring support means, and said stop means, said support shoulder means and said mounting ring support tab means being relatively positioned and shaped such that through opposed longitudinal engagement of said support tab means and said shoulder means, said rotation of said device urges said device longitudinally inward to place said stop means in longitudinal limiting engagement with the outer surface of the ceiling or wall.

13. A mounting ring adapted for installation in an opening in a ceiling or wall to support a device within the opening, said device being tubular and having shoulder means facing longitudinally outward, comprising:

an annular frame portion having an inside diameter sized to permit said device to pass longitudinally inward therethrough;

at least two retaining tabs extending from the frame portion, said retaining tabs being extendible inward through said opening and being manually deformable into retaining engagement with the ceiling or wall to thereby maintain said frame portion positioned adjacent to the ceiling or wall in substantially parallel relation therewith; and said frame portion including support tab means extending substantially radially-inward therefrom for longitudinally-inward supporting engagement with said device shoulder means.

* * * * *